United States Patent

Nishida et al.

[11] Patent Number: 5,867,707
[45] Date of Patent: Feb. 2, 1999

[54] DEVICE FOR BUILDING PROGRAMS EMPLOYING OBJECTS LINKAGE INFORMATION

[75] Inventors: Munechika Nishida; Koichi Sakamoto; Akefumi Kumeta, all of Yokohama; Yuzuru Tanaka, Sapporo, all of Japan

[73] Assignee: Hitachi Software Engineering Co., Ltd., Kanagawa, Japan

[21] Appl. No.: 823,071

[22] Filed: Mar. 24, 1997

Related U.S. Application Data

[63] Continuation of Ser. No. 316,327, Sep. 30, 1994, abandoned.

[30] Foreign Application Priority Data

Sep. 30, 1993 [JP] Japan ..................... 5-244888

[51] Int. Cl.[6] ................................... G06F 9/40
[52] U.S. Cl. .......................... 395/685; 395/710
[58] Field of Search ................... 395/710, 685, 395/701, 680, 683; 707/103

[56] References Cited

U.S. PATENT DOCUMENTS

| | | | |
|---|---|---|---|
| 5,133,075 | 7/1992 | Risch ........................................ | 706/53 |
| 5,206,951 | 4/1993 | Khoyi et al. ............................ | 395/683 |
| 5,265,206 | 11/1993 | Shackelford et al. .................. | 395/683 |
| 5,313,629 | 5/1994 | Abraham et al. ....................... | 707/103 |
| 5,327,559 | 7/1994 | Priven et al. ........................... | 395/671 |
| 5,388,264 | 2/1995 | Tobias, II et al. ...................... | 345/302 |
| 5,519,866 | 5/1996 | Lawrence et al. ..................... | 395/710 |
| 5,649,204 | 7/1997 | Pickett ................................... | 395/710 |
| 5,659,751 | 8/1997 | Heninger ............................... | 385/685 |

OTHER PUBLICATIONS

Borne, I., "A Visual Programming Environment for Smalltalk", Visual Language, 1993 IEEE Symposium, 214–218.
Doyle ed., Microsoft Press Computer Dictionary, p. 319.
Sobell M.G., A Practical Guide to the UNIX System, pp. 339–345.
Sobell M. G. A Practical Guide to the UNIX System, The Bejamin Commings Publishing Company, Inc. pp. 4–10, 32–39, and 332–338. (additional pages from a previously cited reference), 1989.

Primary Examiner—Thomas G. Black
Assistant Examiner—Jack M. Choules
Attorney, Agent, or Firm—Fay, Sharpe, Beall Fagan, Minnich & McKee

[57] ABSTRACT

To permit a user to produce application programs easily, a plurality of object names and objects linkage information is specified as external specification data, the plurality of objects are related to each other based on linkage information stored in an objects linkage information storage, transmission and reception of data between the plurality of objects are controlled, and processes in which the plurality of objects constituting the application program are linked are executed.

7 Claims, 7 Drawing Sheets

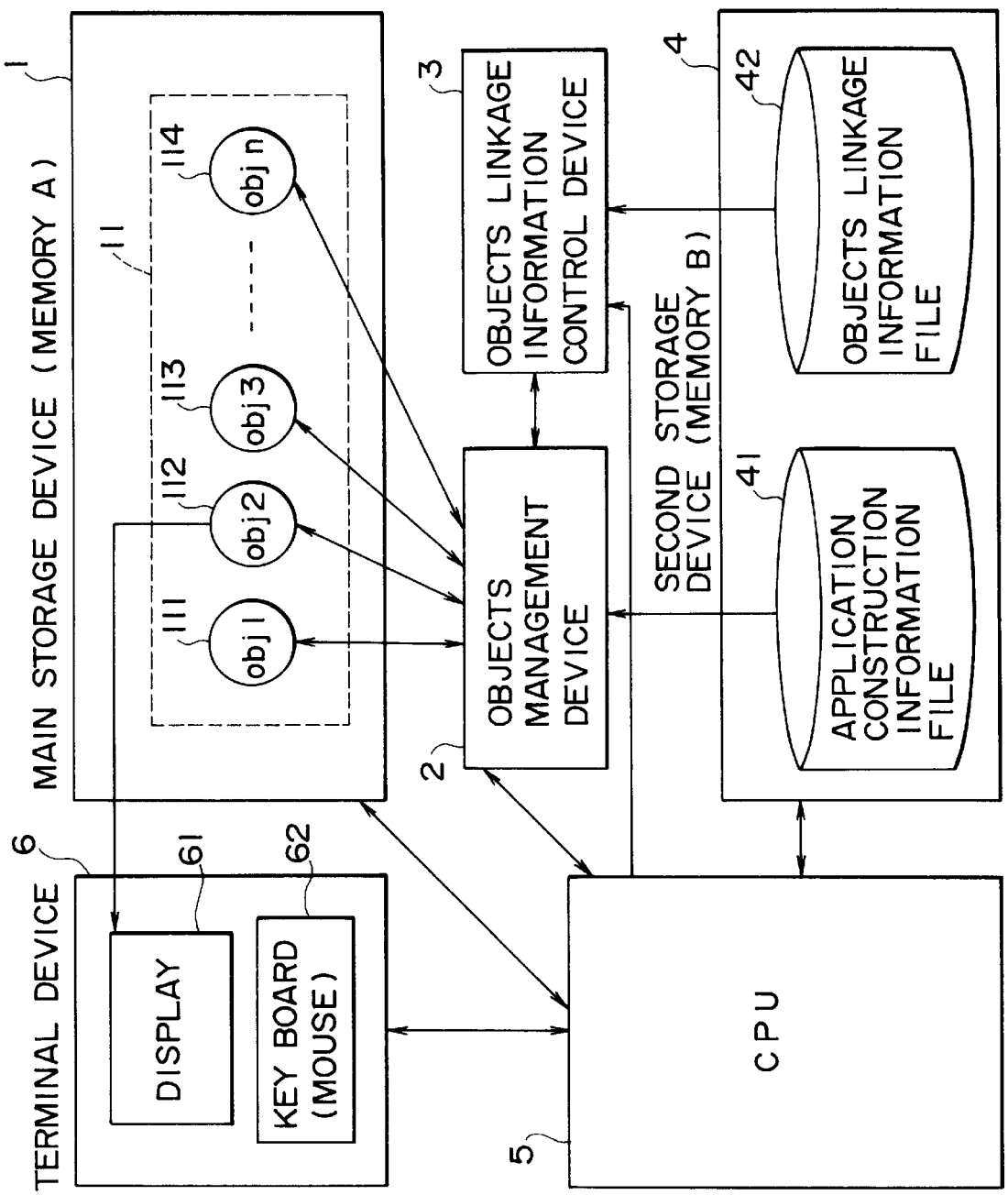

ADD CALCULATOR

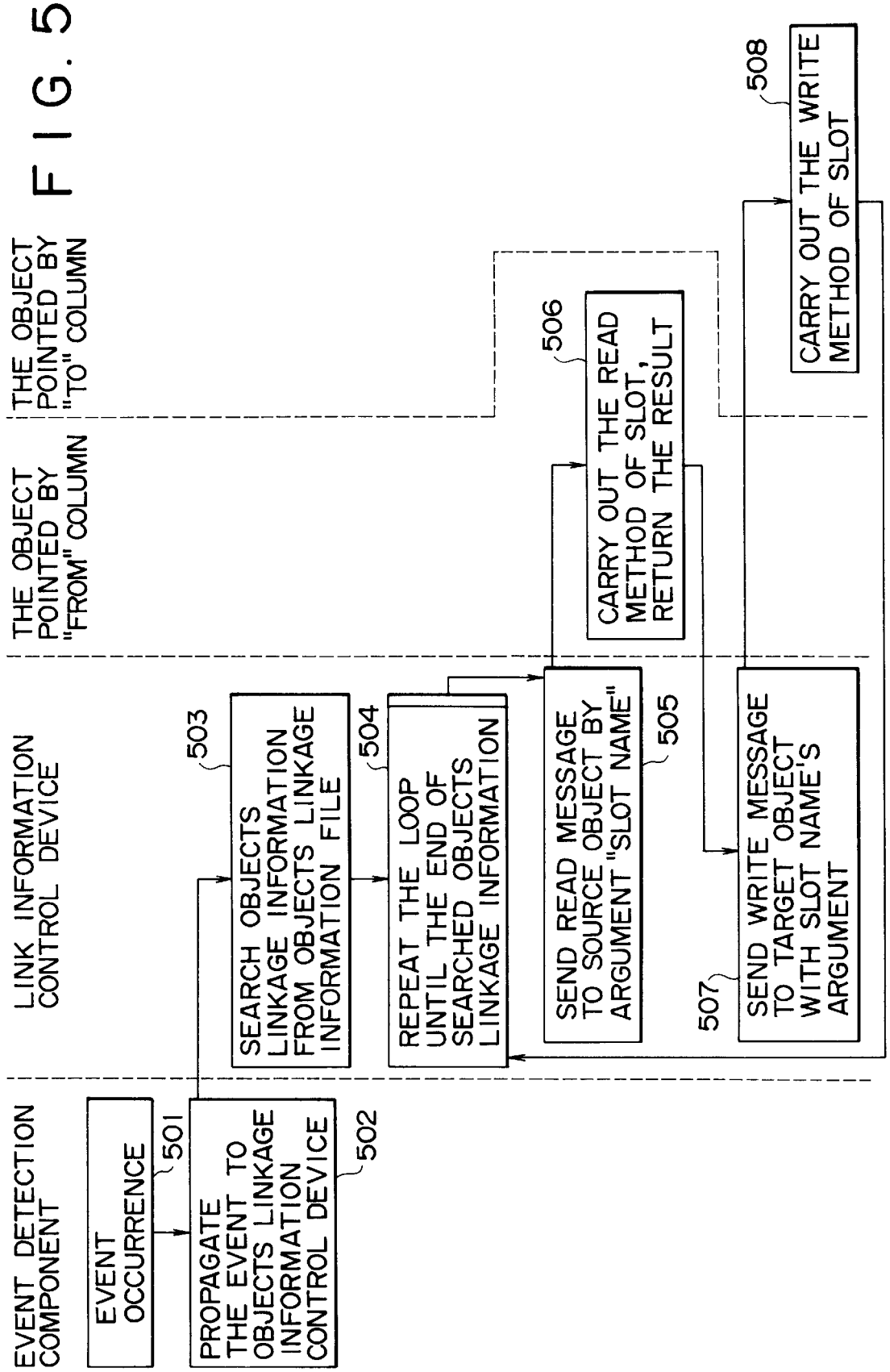

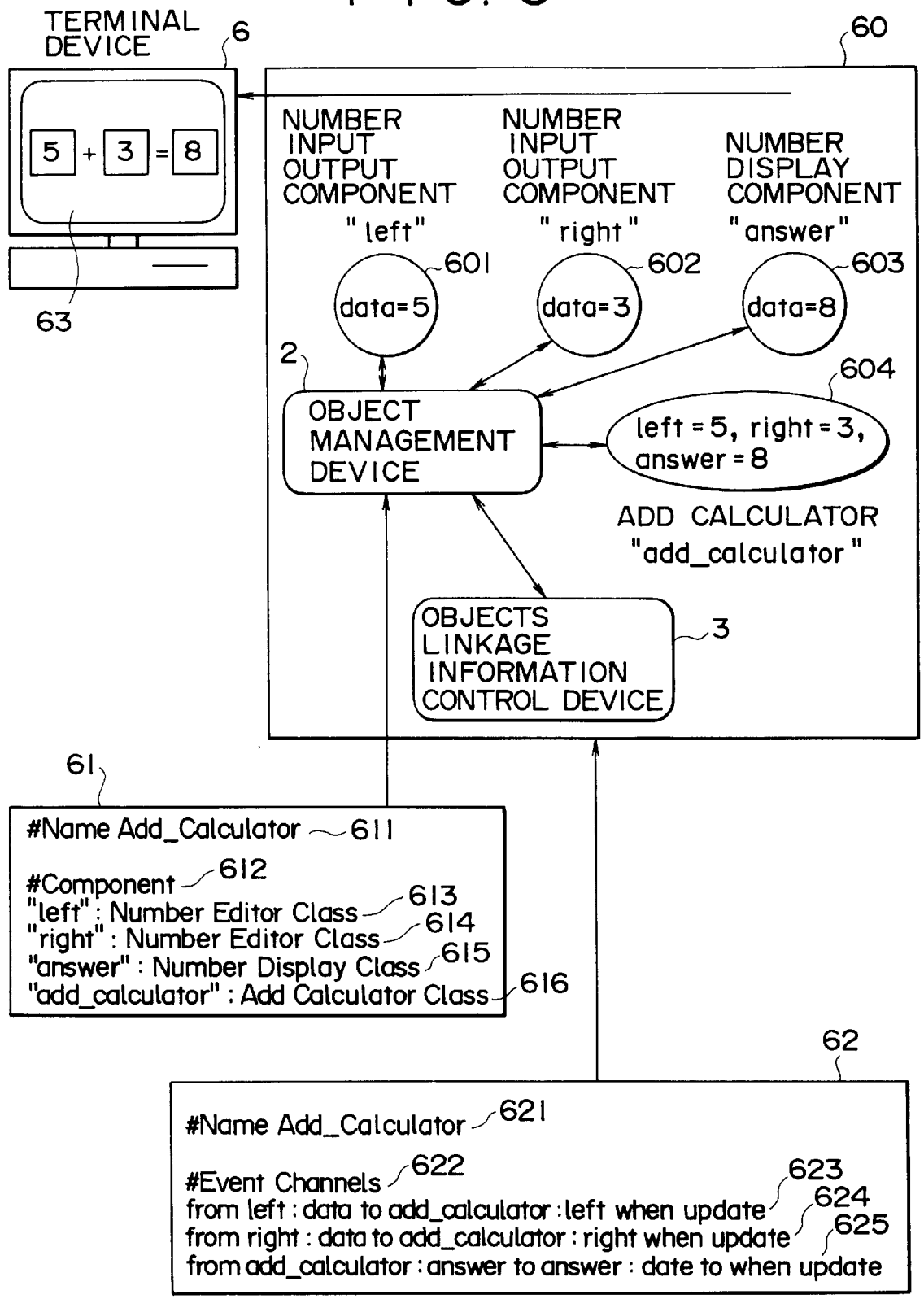

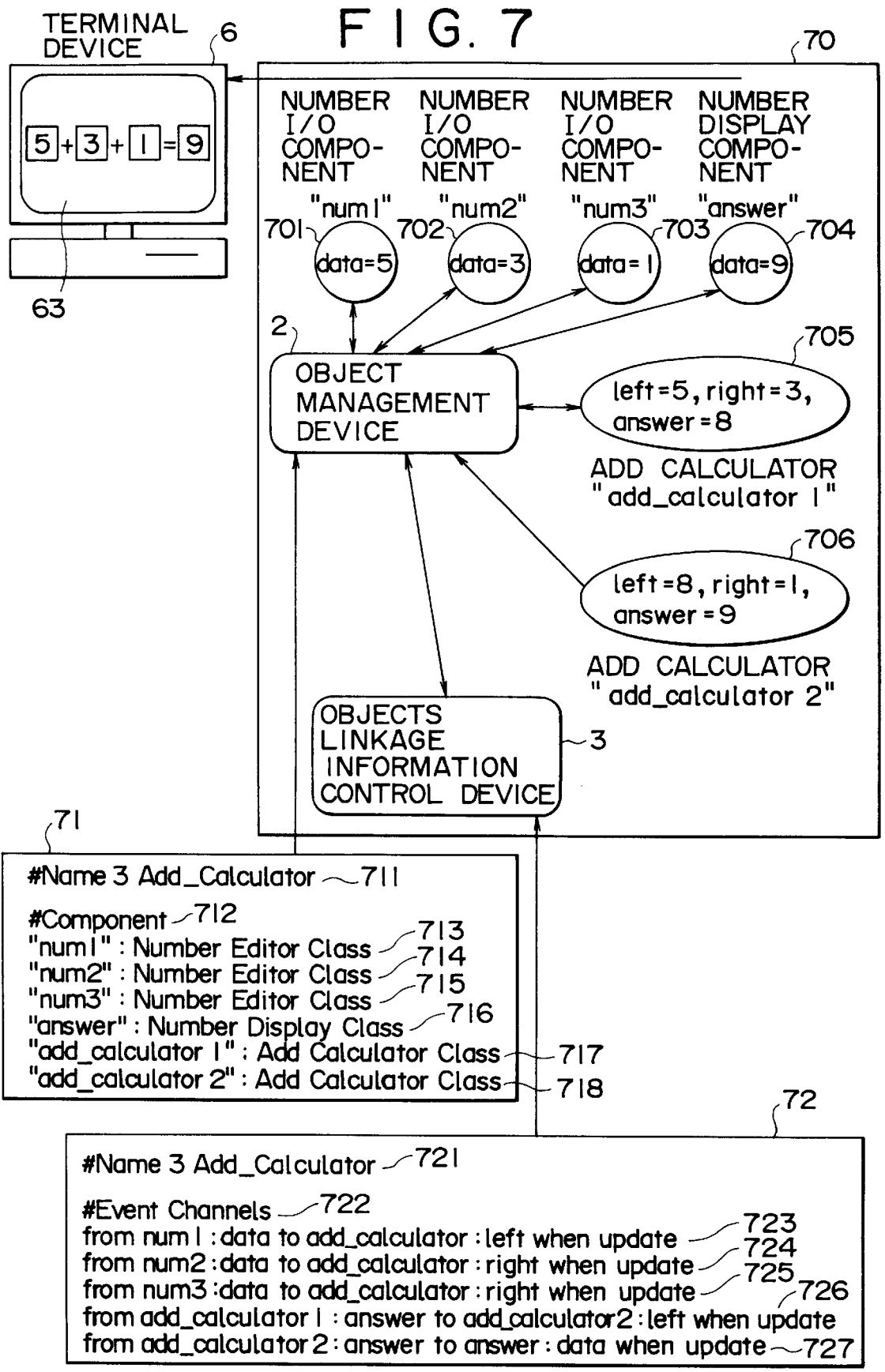

DEVICE FOR BUILDING PROGRAMS EMPLOYING OBJECTS LINKAGE INFORMATION

This is a continuation application of Ser. No. 08/316,327, filed Sep. 30, 1994 now abandoned.

BACKGROUND OF THE INVENTION

The present invention relates to a device for building programs employing objects linkage information intended to improve the efficiency of the development, maintenance and functional enhancement of application programs.

The advancement of computers in recent years has been striking, and in terms of hardware, processing speed has increased greatly and processing capacity has been enlarged dramatically.

Also, in terms of software, improvements in the man-machine interface are progressing to provide computer operating environments which are amenable to the users using these computers, in other words user-friendly.

Object pointing is one way of improving and advancing this man-machine interface.

The term object pointing refers to, for example in the development of an application program (AP, hereinafter), subdividing the computer program into units known as objects (components) which have certain functions and data, and producing the required AP by coding the linkage relationships between these subdivided objects (components) in a source program.

In the past, the source program which defines the objects (components) has held the functions and data of these objects, and held the linkage relationships between these objects; and thus when the linkage relationship between objects are altered, it is necessary to revise the source program, compile to translate the source program and generate the object code, and link the object code.

SUMMARY OF THE INVENTION

The object of the present invention lies in providing a device for building programs employing objects linkage information which permits the user to produce application programs easily.

In order to attain the above object, the present invention provides a device for building programs employing objects linkage information and for linking the data regions of a plurality of objects to each other, comprising: an application construction information storage or file for storing a plurality of object names constituting an application program; an objects linkage information storage or file for storing objects linkage information defining the connection relationships between objects of the plurality of object names stored in the application construction information storage; an objects management device for generating the plurality of objects whose names are stored in the application construction information storage; an objects linkage information control device for controlling transmission and reception of data between the plurality of objects generated by the objects management device from the connection relationships in accordance with the objects linkage information stored in the objects linkage information storage, whereby to allow the execution of processes in which the plurality of objects constituting the application program are connected; and a data specification device for the specifying plurality of object names stored in the application construction information storage, and for specifying the linkage information stored in the objects linkage information storage, as externally specified data.

According to the abovementioned device, the plurality of objects are related to each other based on the objects linkage information stored in the objects linkage information storage, transmission and reception of data between the plurality of objects are controlled, and the process linked by the plurality of objects from which the application program is constructed is executed.

Thus application programs which perform the desired processes can be produced easily by the above device, simply by rewriting the application construction information storage and the objects linkage information storage using an editor. Moreover, while the application is running, the application can open and edit the files of the application construction information storage and the objects linkage information storage.

BRIEF DESCRIPTION OF THE DRAWINGS

FIG. 1 is a system layout diagram showing the overall layout of one embodiment of the present invention.

FIG. 5 is a flow chart showing the processing procedure in a program building device to which the present invention has been applied.

FIG. 6 is an explanatory diagram explaining a two-term computation tool.

FIG. 7 is an explanatory diagram explaining a three-term computation tool.

DESCRIPTION OF THE PREFERRED EMBODIMENTS

Figure 2A:
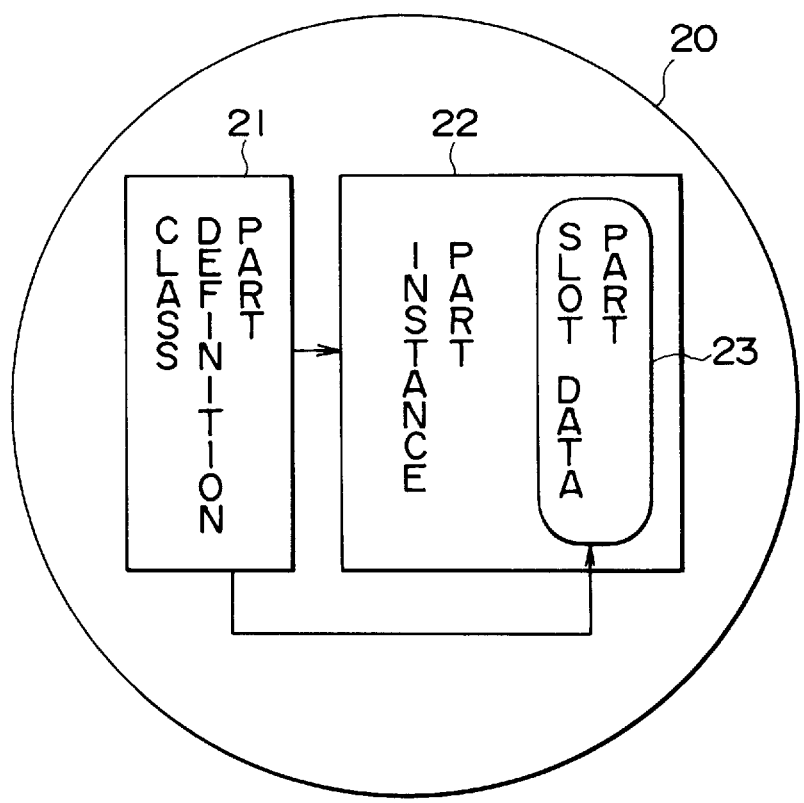
FIG. 2 (A) and (B) are explanatory diagrams explaining the structure of an object (component).

FIG. 1 is a system layout diagram showing the overall layout of one embodiment of the present invention. It should be noted that, when describing the embodiment, objects themselves are termed components, from the nature of their use.

In FIG. 1, a main storage device 1 (memory A) stores a component group 11 comprising a plurality of components (111 to 114). An objects management device 2 generates the required components 111–114 and manages them. An objects linkage information control device 3 controls linkages between the components, and a second storage device 4 (memory B) stores application construction information files 41 which record which components are used to construct the AP and stores objects linkage information files 42 which record linkage information between components. A central processing device 5 executes various processes, and terminal device 6 comprises a display 61 and a keyboard (or mouse) 62 which handles input.

Figure 2B:
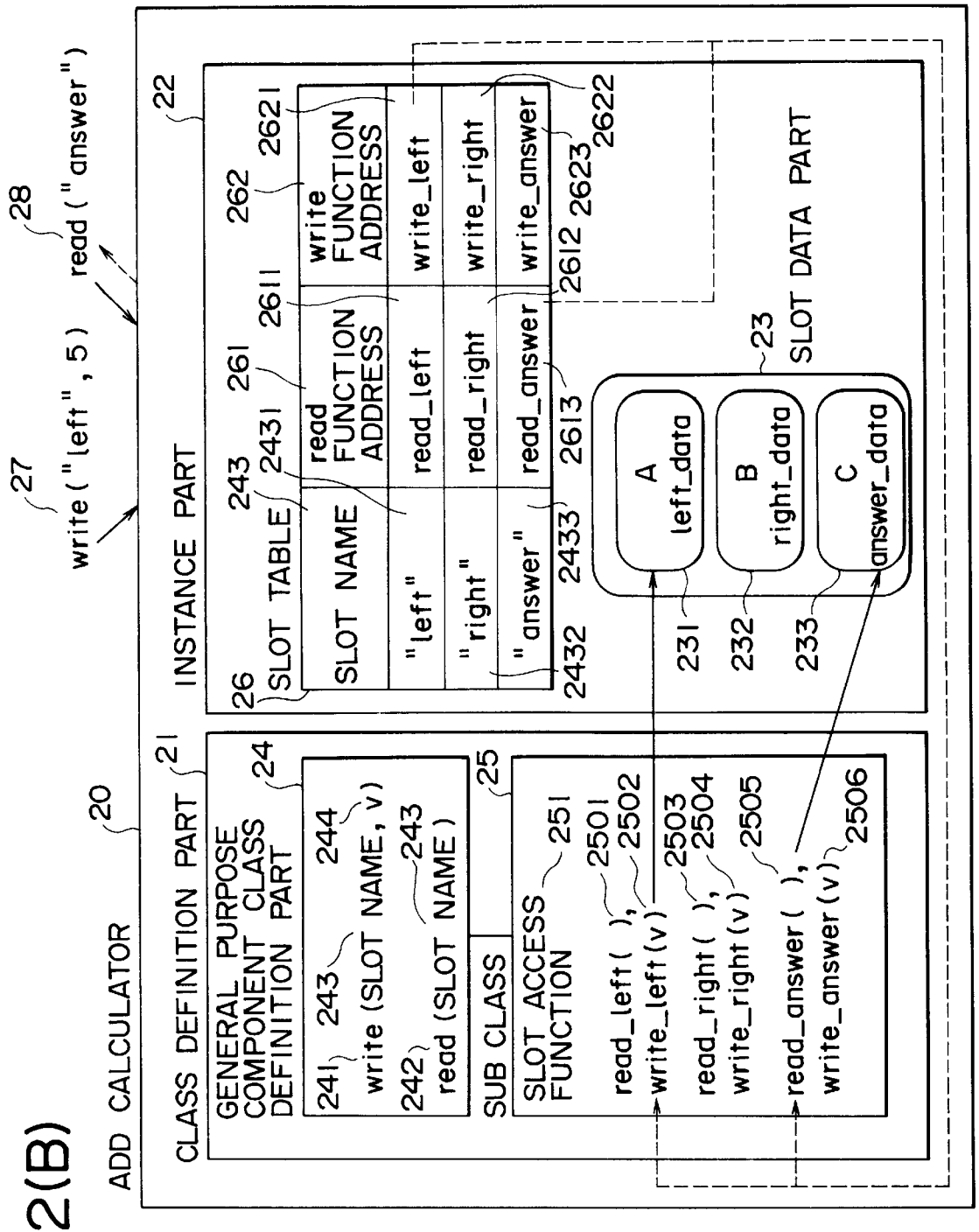

FIGS. 2 (A) and 2 (B) are explanatory diagrams explaining the structure of components 111–114 which function as adding calculators, used in this embodiment.

In FIG. 2 (A), an adding calculator component 20, is constructed from a class definition part 21 which defines the function of this component, a slot data part 23 and an instance part 22 corresponding to the data part.

The combination of data accessible from outside this adding calculator component 20, the data write process and the read process, with a name added in the form of a row of characters, is called a slot, and the data region corresponding to this slot is in the slot data part 23 in the instance part 22.

Access to this component from outside the component is limited to two processes, namely the write process and the read process corresponding to the slot, and is defined as a general purpose super class. The parameters of each process are as follows.

write process: (slot name, write value)
read process: (slot name)

The adding calculator component 20 manages the functions corresponding to the write process and the read process in separate slots, in the slot table 26, and the general purpose super class read method and write methods execute the read process and the write process of the slot prescribed by the parameters.

FIG. 2 (B) is a detailed diagram explaining the adding calculator component 20, and the class definition part 21 consists of another general purpose component class definition part 24 and a subclass 25. Also, a slot table 26 is provided in the instance part 22.

The two definitions of the write process 241 and the read process 242 are stored in the general purpose component class definition part 24. The write process 241 takes the slot name 243 and the write value 244 as parameters, and the read process 242 takes the slot name 243.

Also, the subclass 25 has a slot access function 251, defining a read_left ( ) method 2501, a write_left (v) method 2502, a read_right ( ) method 2503, a write_right (v) method 2504, a read_answer ( ) method 2505 and a write_answer (v) method 2506.

The data region A 231 is of the slot name "left" 2431 of the slot data part 23, the data region B 232 is of the slot name "right" 2432 and the data region C 233 is of the slot name "answer" 2433.

The slot name 243, the read function address 261 and the write function address 262 are stored in the slot table 26, and there are three types of slot name 243, namely "left" 2431, "right" 2432, and "answer" 2433, and there are three types of read function address 261, namely read_left 2611, read_right 2612 and read_answer 2613. Also, there are three types of write function address 262, namely write_left 2621, write_right 2622 and write_answer 2623.

The function addresses read_left 2611, read_right 2612, read_answer 2613, write_left 2621, write_right 2622, and write_answer 2623 point respectively to the function addresses of the slot access function 251, namely read_left ( ) 2501, write_left (v) 2502, read_right ( ) 2503, write_right (v) 2504, read_answer ( ) 2505 and write_answer (v) 2506.

Now, if the adding calculator component 20 is assigned parameters by means of the write command 27 from outside the adding calculator component, then firstly, in the write process 241, from the contents "write("left", 5)" (which means: set the value of slot "left" to "5"), the record whose slot name is "left" is retrieved from the slot table 26, the write_left (v) method 2502 of the slot access function 251 indicated by write_left 2621 which is the corresponding write function address 262, is executed, and the value is written into the data region A (231).

Also when accessed by the read command 28, the record whose slot name is "answer" is retrieved from the slot table 26, from the contents "read("answer")" of the read command 28 (which means: read the contents of the slot "answer"), and the read_answer ( ) method 2505 of the slot access function 251 indicated by the read_answer 2613 of the corresponding read function address 261 is executed, the value in the data region C (233) is read and returned as the return value.

In this way, the method for accessing internal information in components known as slots is prepared in each component, and links between components are carried out by designating the slot name 243 of the component which is to be connected.

Figure 3:
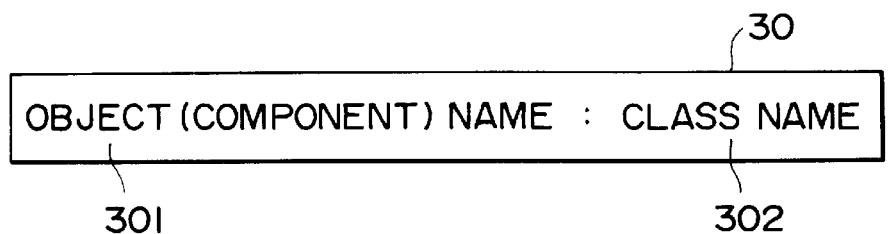
FIG. 3 is a diagram showing the format of an application construction information file.

FIG. 3 is a diagram showing an example of the format 30 of an application construction information storage or file 41, used in the embodiment. The format 30 consists of the component (object) name 301 of the component which is used, and the class name 302 of the component.

Figure 4:
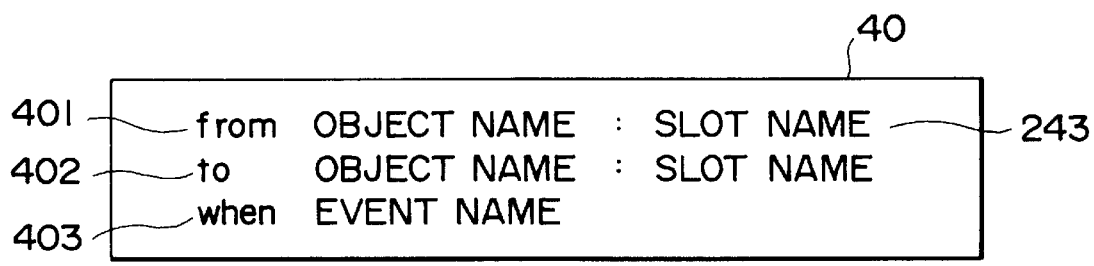
FIG. 4 is a diagram showing the format of an objects linkage information file.

FIG. 4 is a diagram showing an example of the format 40 of an objects linkage information storage or file 42, used in the embodiment. Format 40 consists of a "from" object name 401 indicating the component which originates the connection (referred to as the source object hereafter), a "to" object name 402 indicating the component which is to be linked (referred to as the target object hereafter), a "when" event name 403 indicating the event status at which the components are to be linked, and a slot name 243. These respectively transmit and receive messages to or from the following slot name 243.

FIG. 5 is a flow chart showing the procedure for defining the objects linkage information in the embodiment.

In FIG. 5, firstly, when generating a user-operation event (of event name 403) input by the user's operation from the terminal device 6, or a status update event (of event name 403) generated automatically when the information in the object is updated (step 501), this event generation is notified to the objects linkage information control device 3 (step 502).

The objects linkage information control device 3 then retrieves (from objects linkage information storage 42) the objects linkage information 401, 402, 243 satisfying the corresponding event conditions of event name 403, from the objects linkage information file 42 (step 503). The read message of the corresponding slot name 243 is transmitted to the source object 401 prescribed in the retrieved objects linkage information file 42 (step 505). The processing of the slot of the component designated by the source object 401 executes the read method from the received read message, and returns the result (step 506). A write message with the corresponding slot name 243 as its argument is transmitted to the component designated by the target object 402 (step 507). The processing of the slot of the component designated by the target object 402 executes the write method from the received write message (step 508). This sequence of processes is repeated to the same extent as there is corresponding object linkage information (step 504).

The AP is produced in this way by transmitting and receiving data between components in accordance with the messages described in the object linkage information file 42.

FIG. 6 illustrates an example of display 60, which shows visually the set up of the components being used (601, 602, 603 and 604), the objects management device 2 and the objects linkage information control device 3, which are linked to produce a two-term computation tool. On the terminal device 6, "5+3=8" is displayed on the display 63.

Application construction information 61 is in the application construction information file 41 and is the text describing the class definition of the component in use. Objects linkage information 62 is stored in the objects linkage information file 42 and is the text describing the linkage procedure for the components constituting the two-term computation (adding) tool.

In FIG. 6, number input/output components 601, 602 are identical components, and there is a number display component 603 and an adding calculator component 604.

A two-term computation (adding) tool is constructed using these components. Information relating to which components are being used is stored in the application construction information 61. For example, the text name of line 1 is "Add_Calculator (summing device)" 611, and "# Component (object: component)" 612, as the title, is in line 2.

"Use a number input/output component (Number Editor Class) instance as name "left"" 613, and "use a number input/output component (Number Editor Class) instance as name "right"" 614 are the descriptions in lines 3 and 4. Also, "use a number display component (Number Display Class) instance as the name "answer"" 615 is the description in line 5, and "use an adding calculator component (Add_Calculator Class) instance as name "add calculator" (summing device)" 616 is the description in line 6.

The objects linkage information 62 is the description of a message commanding the linkage procedure between these components, in other words the linkages between components. For example, the text name of line 1 is "Add_Calculator (summing device)" 621, and "# Event Channels" 622, as the title, is in line 2. Also "substitute the value of the slot "data" of the component "left" into the slot "left" of the "add_calculator" at update (when the status of "left" changes)" 623 is the description in line 3.

In the same way, "substitute the value of the slot "data" of the component "right" into the slot "right" of the "Add_Calculator" at update (when the status of "right" changes)" 624 is the description in line 4, and "substitute the value of the slot "answer" of the component "Add_Calculator" into the slot "answer" of the component "answer" at update (when the status of "add_calculate" changes)" 625 is the description in line 5.

In this way, applications can be easily produced, maintained and functionally enhanced, by keeping the class definition information of the component used, and the objects linkage information externally.

In FIG. 7 a three-term computation tool is obtained by adding another number input/output component and another adding calculator component to the two-term computation tool of FIG. 6.

FIG. 7 shows an example display 70 showing visually the set up of the components used (701, 702, 703, 704, 705, and 706), the objects management device 2, and the objects linkage information control device 3, for the case in which a three-term computation tool is produced by actually connecting components. A terminal device 6 displays (5+3+1= 9) on the display 63. Application construction information 71 in the application construction information file 41 is the text describing the class definitions for the components used. Objects linkage information 72 stored in the objects linkage information file 42 is the text describing the linkage procedure for the components constituting the three-term computation (adding) tool.

FIG. 7 further shows identical number input/output components 701, 702 and 703, numerical display component 704, and adding calculator components 705, 706.

A three-term computation (adding) tool is constructed using these components. Information concerning which components are being used is stored in the application construction information 71.

For example, the text name of line 1 is "3 Add_Calculator (three-term summing device)" 711, and "# Component (object: component)" 712, as the title, is in line 2.

Use a number input/output component (Number Editor Class) instance as name "num 1"" 713, "use a number input/output component (Number Editor Class) instance as name "num 2"" 714, and "use a number input/output component (Number Editor Class) instance as name "num 3"" 715 are the descriptions in lines 3, 4 and 5 as definitions in order to use identical components as the number input/output components for the first term, the second term and the third term of the addition.

Also, "use a number display component (Number Display Class) instance as name "answer"" 716 is the description in line 6, and "use an addition calculator component (Add_Calculator Class) instance as name "add_calculator 1" (summing device 1)" 717 and "use an adding calculator component (Add_Calculator Class) instance as name "add_calculator 2" (summing device 2)" 718 are the descriptions in lines 7 and 8.

The objects linkage information 72 is the description of a message commanding the linkage procedure between these components, in other words the linkages between components. For example, the text name of line 1 is "3 Add-Calculator (three-term summing device)" 721, and "# Event Channels (event)" 722, as the title, is in line 2.

Also "substitute the slot "data" of the component "num 1" into the slot "left" of "add_calculator 1" at update (when the status of "num 1" changes)" 723 is the description in line 3.

In the same way "substitute the slot "data" of the component "num 2" into the slot "right" of "add_calculator 1" at update (when the status of "num 2" changes)" 724 is the description-in line 4, "substitute the slot "data" of the component "num 3" into the slot "right" of "add_calculator 2" at update (when the status of "num 3" changes)" 725 is the description in line 5, "substitute the slot "data" of the component "add_calculator 1" into the slot "left" of "add_calculator 2" at update (when the status of "add_calculator 1" changes)" 726 is the description in line 6, and "substitute the slot "data" of the component "add_calculator 2" into the slot "data" of "answer 2". NB, at update (when the status of "add_calculator 2 changes)" 727 is the description in the last line. In this way, a three-term computation tool can be produced easily using a two-term computation tool as the base, merely by adding the necessary components and altering the description of the objects linkage information.

Moreover, the linkage information 72 in FIG. 7 can also be described by means of symbols such as arrows, instead of a row of characters. Conversion to symbols has the advantage that the connection relationships are even clearer for the beginner.

According to the present invention, as described above, there are provided an application construction information storage in which a plurality of object names constituting the application program are stored; an objects linkage information storage in which linkage information prescribing the connection relationships between objects of the plurality of object names stored in the application construction information storage are stored; an objects management device which generates the objects of the plurality of object names stored in the abovementioned application construction information storage; and an objects linkage information control which controls transmission and reception of data between the plurality of objects generated by the abovementioned objects management device form the connection relationships in accordance with the linkage information stored in the abovementioned objects linkage information storage. The objects linkage information control executes the processes in which the plurality of objects constituting the application program are connected; and the plurality of object names stored in the abovementioned application construction information storage and the linkage information stored in the objects linkage information storage are specified as externally specified data. The desired application programs can be produced easily, merely by rewriting the object names and the objects linkage information constituting the application.

Thus, application programs which in the past relied on program developers who had a high level of specialist knowledge can be developed easily, and this has the advantage that a more user-friendly man-machine interface can be achieved.

While the preferred embodiment has been set forth along with modifications and variations to show specific advantageous details of the present invention, further embodiments, modifications and variations are contemplated within the broader aspects of the present invention, all as set forth by the spirit and scope of the following claims.

What is claimed:

1. A device for building application programs subdivided into objects having functions and data, which programs employ objects linkage information, and for linking the data of the objects to each other, comprising:

an application construction information storage for storing a plurality of object names of objects constituting an application program;

an objects linkage information creation device for creating textual linkage information defining connection relationships between the objects having the plurality of object names stored in said application construction information storage;

an objects linkage information storage for storing the objects linkage information;

a data input specification device for externally specifying the object names stored in the application construction information storage and the objects linkage information stored in the objects linkage information storage as externally specified data in an external specification file;

an application construction information editing device for editing a textual description in said linkage information;

an objects management device for generating and managing the objects whose object names are stored in the application construction information storage;

an objects linkage information control device for controlling transmission and reception of data between the objects from the connection relationships in accordance with the objects linkage information stored in the objects linkage information storage, for execution of processes in which the objects constituting the application program are connected;

a file storage device comprising the application construction information storage and the objects linkage information storage for storing the object names and objects linkage information as specification data in a file external to the application program;

a data retrieval for retrieving the specification data in the external file; and an editor for editing the specification data retrieved using the data retrieval;

wherein said application construction information storage includes the specification data having the format of an object name associated with a class name; and wherein said objects linkage information storage has the specification data with a format of a source object name associated with a slot name, a destination object name associated with a slot name, and an event name for triggering source-to-destination connection.

2. A device for building programs as claimed in claim 1, further comprising an event detection object for detecting the occurrence of an event whose event name is a part of the specification data in said objects linkage information storage, and propagating detection to said objects linkage information control device;

said objects linkage information control device, upon receiving a propagated detection from the event detection object, searching the objects linkage information storage for an event name corresponding to the detection and, upon finding such an event name, sending arguments of corresponding slot names stored with the event name from the source object of the associated object name to the destination object of an associated object name so that the destination object carries out any appropriate processing based upon said arguments and returns a result to said objects linkage information control device; and said objects information linkage control device, upon receiving a returned result, sending a write message to the objects linkage information storage of the destination object slot name argument so that the destination object carries out a write process of the associated slot name.

3. A device for building programs as claimed in claim 2, further comprising:

a display for displaying the specification data retrieved using the data retrieval; and a terminal device including said display and a user input.

4. A device for building programs as claimed in claim 3, further comprising a central processing unit bidirectionally coupled to said display, bidirectionally coupled to said objects management device and bidirectionally coupled to said file storage device;

said objects management device being further bidirectionally coupled to said objects linkage information storage.

5. A device for building programs as claimed in claim 4, further comprising a main storage device, separate from said file storage device, bidirectionally coupled to said central processing unit and bidirectionally coupled to said objects management device;

wherein said main storage device stores the objects.

6. A device for building programs as claimed in claim 5, wherein said main storage device is unidirectionally coupled for transmission to said objects management device and said objects linkage information control device.

7. A device for building programs as claimed in claim 6, wherein said central processing unit is unidirectionally coupled to transmit information to said objects linkage information control device.

* * * * *